Oct. 24, 1950     G. P. SMITH     2,526,703
METHOD OF MANUFACTURING ELECTRICAL CONDENSERS
Filed March 3, 1944
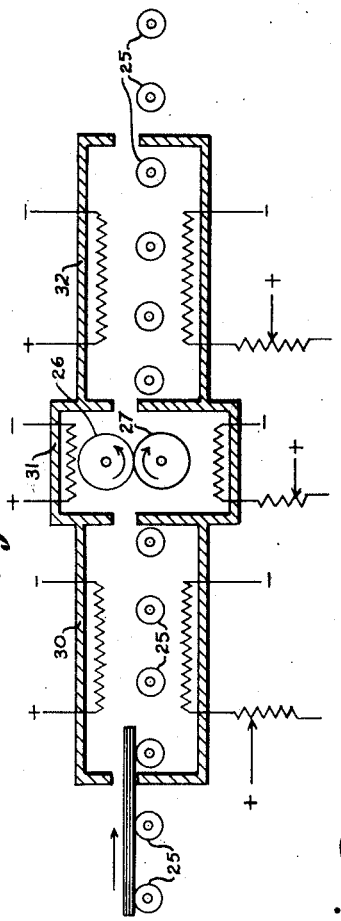
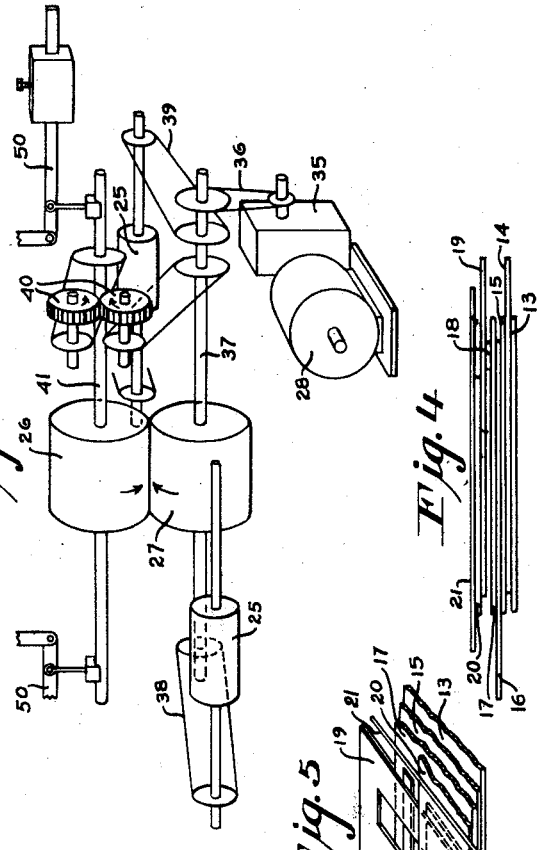
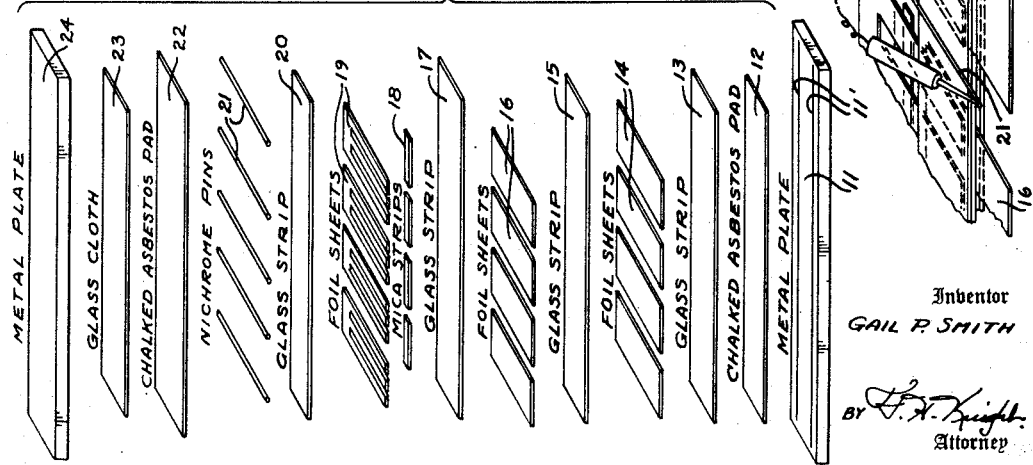
Inventor
GAIL P. SMITH
By T. H. Knight
Attorney Patented Oct. 24, 1950

2,526,703

UNITED STATES PATENT OFFICE 2,526,703

METHOD OF MANUFACTURING ELECTRICAL CONDENSERS

Gail P. Smith, Corning, N. Y., assignor to Corning Glass Works, Corning, N. Y., a corporation of New York Application March 3, 1944, Serial No. 524,897

5 Claims. (Cl. 49—79)

1

The present invention relates to improved methods of manufacture of condensers embodying a dielectric vitreous material such as glass or the like.

The prime object of the invention is an improved method of condenser manufacture involving a novel method of severing a plurality of glass connected condenser assemblies or the like from one another.

Other objects and features of the invention will present themselves in the course of the description of the invention.

The preferred embodiment of the invention will now be described as applied to the form of condenser disclosed in a Bair application for "Condenser and Method of Assembly," Sr. No. 524,908 filed concurrently herewith and assigned to the assignee of the present application.

In the accompanying drawing,

Fig. 1 diagrammatically illustrates a heating and pressing apparatus by means of which certain steps of the invention may be carried out, and also shows an assembled strip of condensers embodying the invention being conveyed into the furnace;

Fig. 2 is a diagrammatic view illustrating a suitable arrangement for driving conveying and pressing rollers associated with the furnace of Fig. 1;

Fig. 3 is an exploded perspective view of an assembly embodying the invention as prepared for passage through the furnace;

Fig. 4 is an end elevation of a strip of condensers embodying the invention; and Fig. 5 is a perspective view illustrating the step of separating a strip of condensers into individual condenser units.

Referring now to Fig. 3, the assembly as prepared for passage through the conveyor furnace of Fig. 1, comprises a strip of sheet metal 11 of dimensions appreciably greater than a strip of condenser assemblies to be assembled thereon. Arranged on strip 11 is a chalked asbestos pad 12 upon which is superimposed a strip of glass foil 13. Individual condenser elements or sheets 14 of metal foil are then arranged in laterally spaced relation on strip 13 with one edge of each sheet 14 set inward from the edge of strip 13 a distance indicated by one of the score lines 11' in strip 11 and with the opposite edge of

2 each sheet projected well beyond the opposite edge of the strip, the latter edge of the sheet serving as one tab or terminal of a condenser assembly. A second strip of glass film 15 is then superimposed on sheets 14 and vertically aligned with strip 13. The next layer of the assembly is composed of laterally spaced metal foil sheets 16. Each sheet 16 is like sheets 14 but projects over the opposite edge of strips 13 and 15 and serves as the other tab or terminal of a condenser. A third strip of glass film 17 is then arranged over sheets 16 in vertical register with strips 13 and 15. The number of alternate layers of foil sheets and glass film strips employed is of course determined by the capacitance of the condensers desired. For the purpose of simplicity a condenser strip having but three layers of metal foil has been shown.

It is often desirable to slightly reduce the capacity of a completed condenser to a predetermined standardized value. As taught and claimed in my application Sr. No. 524,896 filed concurrently herewith, now Patent No. 2,405,529 granted August 6, 1946, to enable this to be done the sheets of the final layer may be flagged and each branch of a sheet made available for separation from the sheet, thus enabling the capacitance of a condenser to be reduced in one, two or more increments. To provide the foregoing feature, narrow strips 18 of mica are arranged on the glass strip 17 a small distance inward from the edge over which the final layer of metal foil sheets are to project, and serve to prevent a narrow cross-sectional area of the attached ends of the flagged sections of the final layer of foil sheets 19 from later becoming bonded to the glass strip 17. After placement of sheets 19 on strip 17 a narrow strip 20 of glass film is arranged to cover those portions of sheets 19 projecting to the left (Fig. 5) of strips 18.

To enable easy severance, of the assembled strip into individual condenser units, Nichrome wires 21 are next arranged on glass strip 20 transverse thereto wherever it is desired to later sever the assembled strip. As illustrated, the wires 21 are arranged outside the edges of the end condenser pile-ups to trim excess end portions of the glass strips therefrom and are also arranged intermediate adjoining pile-ups to separate them from one another. Wires 21 and the underlying assembly are next covered with a chalked asbestos pad 22, which is then covered with a pad 23 of coarsely woven material of glass or asbestos cloth or the like, and the whole covered by a sheet metal plate 24 and the assembly placed on those rollers 25 at the left end of the furnace assembly.

Rollers 25 and pressing rollers 26 and 27 are all driven by a single motor 28 as required to advance material through the furnace at a uniform predetermined speed.

Specifically the motor 28 is coupled to a gear reduction unit 35 which, by means of a chain 36, drives pressing roller supporting shaft 37 in a clockwise direction while the rollers 25 receive their drive from shaft 37 through chains 38 and 39. Pressing roller 26 is on the other hand driven in a counter-clockwise direction by interposition of a pair of gears 40 in a drive between shaft 37 and shaft 41 carrying pressing roller 26.

The pressing of the assembly is for producing an intimate void-free bond between the metal and dielectric foil layers. The pressure necessary to accomplish this, of course, depends on the number of layers in the particular assembly being manufactured. The pressure applicable to rollers 26 and 27 has accordingly been made adjustable by the use of scale beam weighted levers 50 exerting downward pressure on the upper pressing roller shaft 41.

The furnace proper comprises a pre-heating section 30, a heating and pressing section 31, and an annealing section 32. As diagrammatically illustrated, each of the sections 30, 31, and 32 contains a pair of electric heating elements. The electric current supplied to the elements of the respective sections of the furnace is so adjusted that the temperature maintained within section 30 is such that an assembled strip of condensers attains a uniform temperature near the softening temperature of its glass strips by the time it starts entering section 31 and reaches or slightly exceeds the softening temperature just before entering pressing rollers 26 and 27. As the wires 21 pass between rollers 26 and 27 they form grooves or indentations in the glass. The temperature of section 32 is so adjusted that the strip issues therefrom with the glass in a strain-free condition and at a temperature approaching room temperature.

The strip, after issuing from the furnace, is divided into individual condensers or into laterally spaced groups by including the Nichrome wires 21 in an electric heating circuit as illustrated in Fig. 5, whereupon the wires are heated and severance effected by thermal shock. As separation is effected, the Nichrome wire also breaks away from the glass and may be used again. By using wires of a cross section approximately equal to the combined thickness of the metal foil sheets used, a state of compression of the dielectric bounding opposite edges of the foil sheets can be achieved equalizing that attained in the area occupied by the foil, thus effectively sealing such edges against the entry of moisture.

The asbestos pads 12 and 22 and the cloth 23 provide a cushioning action which compensates for slight irregularities in the glass films and prevents excessive fracture of glass strips of the assembly while being subjected to the pressure of rollers 26 and 27. The chalking of asbestos pads 12 and 22 prevents objectional sticking of the glass to the pads.

While the pressing of the assembly is taking place, the wires and metal foil are wet by the softened glass and become thoroughly bonded thereto. Obviously, the glass strips of the assembly at the same time become bonded to one another wherever they overlap the foil sheets and in the areas between pile-ups. It will be appreciated therefore that the strip issuing from the furnace comprises a unitary body of glass having imbedded therein and thoroughly bonded thereto the metal parts of the assembly.

As will be appreciated, the transverse flagged sections of sheets 19 arranged over the mica strips 18 do not bond to the mica. The condenser capacity, accordingly, can readily be reduced by removing one or more of the unbonded flagged portions from a sheet 19.

What is claimed in the instant application is:

1. The method of separating a thin strip of glass transversely into a number of sections which includes arranging heating elements in the form of wires or the like on the strip transverse thereto along the desired lines of severance, heating the glass and wires to the softening temperature of the glass, imbedding the wires into the glass by application of pressure, and effecting severance of the strip into sections by thermal shock by passing heating current through the wires.

2. The method of manufacturing condensers which includes the arranging of a series of laterally spaced metal foil elements on a strip of glass film, adding similar layers of foil elements and glass strips as required to produce condensers of a desired capacitance, arranging electrically conductive wires transverse of the glass strips at points intermediate the laterally spaced metal foil elements as the final layer of the assembly, heating the assembly to the softening temperature of the glass, pressing the assembly into a unitary bonded mass, and severing the respective condensers from one another and the wires from the glass by passing electric heating current through the wires.

3. The method of condenser manufacture which includes piling sheets of metallic foil into laterally spaced stacks while vertically separating the sheets of the respective stacks with strips of glass, arranging metallic wires along the top strip of glass along lines running between stacks, heating the whole to the softening temperature of the glass, pressing the assembly and separating the respective stacks from one another by fracture of the glass along the lines occupied by the wires.

4. The method of manufacturing condensers, which includes laterally spacing sheets of metal foil along the length of a strip of glass film, arranging a second strip of glass film on said sheets of foil in vertical alignment with the first strip, similarly laterally spacing a second layer of sheets of metal foil on the second strip of glass film, placing a third strip of glass film over the second layer of metal foil sheets, arranging metallic wire across the third strip in the vertical plane of the spaces between the sheets of metal foil, heating the assembly to the softening temperature of the glass, pressing the assembly, annealing the assembly and laterally separating the assembly into individual condenser units by fracturing the glass along the lines occupied by the wires.

5. The method of separating a thin strip of glass transversely into a number of sections which includes arranging elements in the form of wires or the like on the strip transverse thereto along the desired lines of severance, heating the glass and wires to the softening temperature of the glass, imbedding the wires into the glass by application of pressure, and utilizing the wires to effect severance of the strip into sections by fracture of the glass along the lines occupied by the wires.

GAIL P. SMITH.

REFERENCES CITED

The following references are of record in the file of this patent:

UNITED STATES PATENTS

| Number | Name | Date |
|---|---|---|
| 220,908 | Arbogast | Oct. 28, 1879 |
| 531,874 | Shuman | Jan. 1, 1895 |
| 531,875 | Shuman | Jan. 1, 1895 |
| 676,799 | McLoughlin | June 18, 1901 |
| 844,767 | Arbogast | Feb. 19, 1907 |
| 887,598 | Delloye | May 12, 1908 |
| 1,548,108 | Sweet | Aug. 4, 1925 |
| 1,562,533 | Weintraub | Nov. 24, 1925 |
| 2,032,003 | Clause | Feb. 25, 1936 |
| 2,116,129 | Stringer | May 3, 1938 |
| 2,334,604 | Bunger | Nov. 16, 1943 |